(12) United States Patent
Sheikh et al.

(10) Patent No.: US 9,584,164 B1
(45) Date of Patent: Feb. 28, 2017

(54) DIGITAL INTENSIVE HYBRID ADC/FILTER FOR LNA-FREE ADAPTIVE RADIO FRONT-ENDS

(71) Applicant: Intel Corporation, Santa Clara, CA (US)

(72) Inventors: Farhana Sheikh, Hillsboro, OR (US); Amy L. Whitcombe, Lake Oswego, OR (US); Erkan Alpman, Portland, OR (US); Yanjie Wang, Hillsboro, OR (US); Shreyas Sen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/049,616

(22) Filed: Feb. 22, 2016

(51) Int. Cl.
*H04B 1/00* (2006.01)
*H04B 1/10* (2006.01)
*H04L 27/00* (2006.01)

(52) U.S. Cl.
CPC ............. *H04B 1/0042* (2013.01); *H04B 1/10* (2013.01); *H04L 27/0002* (2013.01)

(58) Field of Classification Search
CPC .. H04B 1/0028; H04B 1/0035; H04B 1/0042; H04B 1/0096; H04B 1/005; H04B 1/26; H04B 1/30
See application file for complete search history.

(56) References Cited

U.S. PATENT DOCUMENTS

| 2009/0176471 A1* | 7/2009 | Ishiguro | H04B 1/1027 455/317 |
| 2010/0215124 A1* | 8/2010 | Zeong | H04B 1/1036 375/316 |
| 2011/0051849 A1* | 3/2011 | Lindoff | H04B 1/123 375/316 |
| 2012/0038498 A1* | 2/2012 | Oshima | H03M 1/1033 341/110 |
| 2014/0194081 A1* | 7/2014 | Tohidian | H04B 1/26 455/258 |
| 2016/0056774 A1* | 2/2016 | Ilkov | H03F 1/565 330/251 |

* cited by examiner

*Primary Examiner* — Ping Hsieh
(74) *Attorney, Agent, or Firm* — Eschweiler & Associates, LLC

(57) ABSTRACT

A mixer-first receiver operates to generate filtering and analog-to-digital conversion concurrently and adaptively, while removing an LNA before a mixer to enable integration with digital baseband circuits. A plurality of switching capacitor arrays are integrated with a hybrid analog-to-digital filtering component. Switching capacitor arrays of the plurality of switching capacitor arrays can be selectively modified to perform both the filtering operation and the conversion operation together. The same switch capacitors of a switching capacitor array can be utilized in one phase of a clock cycle for the filtering and in another phase of the clock cycle for the conversion.

25 Claims, 9 Drawing Sheets

DIGITAL INTENSIVE HYBRID ADC/FILTER FOR LNA-FREE ADAPTIVE RADIO FRONT-ENDS

FIELD

The present disclosure relates to a hybrid analog digital converter (ADC) and/or filter, and more specifically, a digital-intensive hybrid ADC/filter for adaptive low noise amplifier (LNA)-free radio front ends in radio communication.

BACKGROUND

Adaptive radios capable of dynamically trading off energy for signal-to-noise ratio (SNR) slack can enable significant power savings, but developing a fully reconfigurable analog front-end, which achieves suitable performance in digital-optimized process technology presents a major challenge to building low-power adaptive radios. Two of the major functions of an analog receiver front-end-blocker include rejection filtering and low-noise amplification for digital CMOS processes. However, a challenge remains to implement these functions while reducing manufacturing cost and leveraging the advantages of high-speed digital process technologies.

For example, mobile communication platforms require multiple radios to operate simultaneously, creating co-existence issues. For example, a Wi-Fi receiver co-existing with an LTE transmitter needs to handle the LTE blocker (i.e., resulting interference signal) and hence needs high linearity to ensure the receiver is not saturated. However, such high linearity receivers consume a significant amount of power, which is disadvantageous for mobile devices that utilize a battery for power.

DETAILED DESCRIPTION

Figure 1:
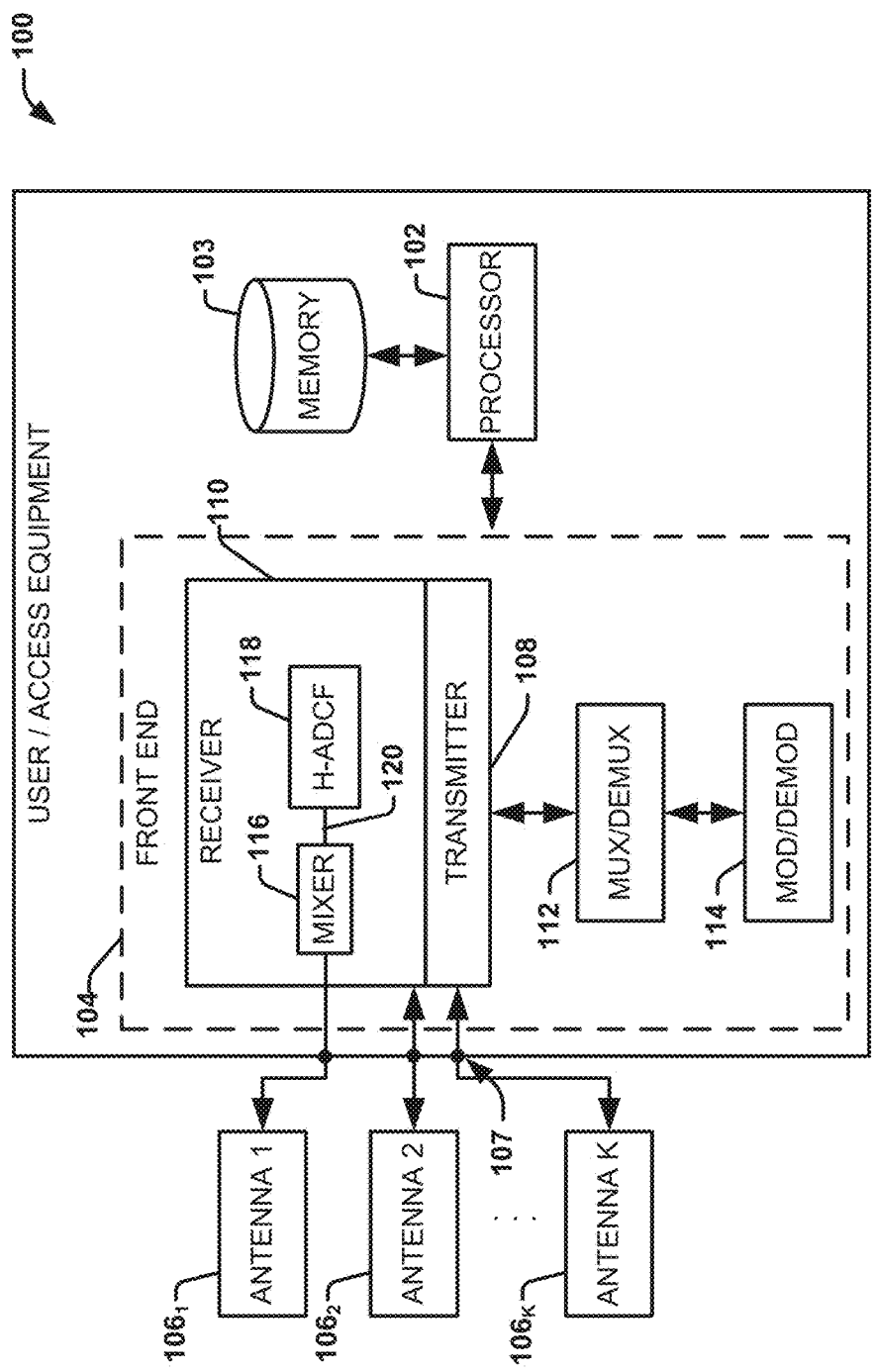
FIG. 1 is example architecture of a user or access equipment for a receiver hybrid ADC filter front end implementing various aspects described.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, a programmable processing circuit, a programmable array, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

In consideration of the above described deficiencies, an analog-to-digital converter (ADC) and impulse response filter are combined into an integrated hybrid ADC filter component that integrates low-noise amplification (traditionally handled by an explicit low noise amplifier (LNA) component) and blocker rejection filtering. The high-level receiver frontend architecture proposed eliminates the LNA component in the frontend architecture (e.g., a radio frequency (RF) frontend) and can significantly leverage high-performance digital CMOS processes.

In one example, a frontend component (e.g., an RF-frontend) can comprise a mixer-first receiver connected to an antenna port that receives analog signals of different operating frequency bands. The antenna port can be a connection or link that provides the analog signals to the frontend component. As a mixer-first receiver, the receiver can be connected to the antenna port without an LNA, while the antenna port is connected to an antenna that receives the different analog signals, which can include a variety of different operating frequency bands of different frequency carriers. The mixer can be coupled to the antenna port to form a mixer-first receiver architecture. The mixer thus receives the analog signals of one or more various operating bands and can further down-convert the analog signals at the RF frontend to generate a base band signal.

In one embodiment, the hybrid analog-to-digital converter (ADC) filter component can be coupled to the mixer component via the signal path pipeline and include a plurality of switching capacitor arrays of switching capacitor banks that can adaptively generate a discrete-time filtering operation of the baseband signal and a conversion of the baseband signal to a digital signal in a same clock cycle, simultaneously or concurrently. The hybrid ADC filtering component can generate this dual adaptive operation, including filtering and conversion operations together, by time interleaving a selective activation of the switching capacitor arrays within the same clock cycle. For example, the filtering can be facilitated at least partially or completely within one portion of the clock cycle, and the conversion can be generated in another portion so that the same capacitors are implemented for the different operations in the same clock cycle.

Further, the hybrid ADC filter(ing) component can simultaneously perform the filtering operation and the conversion operation while also utilizing the same capacitors or components for both impulse response filtering and the conversion operation from analog to digital signals. The hybrid ADC filter component can time interleave between different capacitor banks or different arrays at each clock cycle or period. The time interleaving can be based on one or more criteria, for example, which can include a blocker signal strength of a blocker signal, a signal-to-noise ratio, a channel estimation, a power level at the signal pipeline, or other criteria, such as the operating band of the analog signal, for example.

The hybrid ADC component can thus perform a two stage signal processing with coarse grain and fine grain signal tuning or adjusting. The fine grain component, as the second stage, can include a voltage controlled oscillator (VCO)-based first order delta sigma ADC architecture, for example, as the fine grain component, which receives the a fixed DC, filter output as a final residue at a successive approximation (SAR) output of the coarse grain component. The VCO-based first order delta sigma ADC can operate to oversample the SAR output and further amplify a SAR residue from the plurality of switching capacitor arrays based on a voltage-to-frequency gain of a VCO that is selectively coupled to the switching capacitor arrays. Additional aspects and details of the disclosure are further described below with reference to figures.

Referring to FIG. 1, illustrated is an exemplary user equipment or mobile communication device 100 that can be utilized with a receiver according to various aspects. The mobile communication device 100, for example, comprises a digital baseband processor 102 that can be coupled to a data store or memory 103, an RF front end 104 and a set (one or more) of antenna ports 107 for connecting to a set of antennas $106_1$ to $106_k$ (k being a positive integer), which can receive and transmit signals via one or more wireless devices (e.g., access point(s), access terminal(s), wireless port(s), router(s) and so forth, which can operate within a radio access network or other communication network.

The front end 104 can be a radio frequency (RF) front end and include a communication platform, which comprises electronic components and associated circuitry that provide for processing, manipulation or shaping of signals transmitted or received via the transmitter 108 or receiver 110, a mux/demux component 112, and a mod/demod component 114. The front end 104 can be coupled to the digital baseband processor 102 and the antenna ports 107. The set of antennas $106_1$ to $106_k$ can be part of the front end.

In one embodiment, the front end 104 (e.g., a mixer-first receiver analog front-end) is integrated without an explicit LNA component, while comprising a low power profile. The front end 104 thus operates as a low noise amplifier free mixer-first front end configured to selectively filter analog signals being received for a bandwidth selection or for signals at a predetermined bandwidth. The receiver 110 of the mobile communication device 100, for example, includes a mixer 116 and a hybrid analog-to-digital converter (ADC) filtering component 118 connected by a conducting signal path 120. The receiver 110 can be a mixer-first receiver, for example, where the mixer 116 is directly connected to the antenna port(s) 107 and antennas $106_1$ to $106_k$ without intervening components other than a wireless connection or a wired conductive path.

The mixer 116 can operate to receive analog signals from the antenna port 107 and can down-convert the analog signals to a baseband frequency signal for further processing. The mixer 116 provides the downconverted baseband signal to the hybrid analog-to-digital converter (ADC) and filter (H-ADCF) component 118. The H-ADCF component 118 integrates an ADC for analog-to-digital conversion operations and a filter for filtering with a finite impulse response. The H-ADCF generates a low-noise amplification (traditionally handled by an explicit LNA component) with blocker rejection filtering at the same time, simultaneous, at about the same time or currently, for example.

The H-ADCF component 118 can be an adaptable two-stage component that can combine one or two low power ADCs and an integrated discrete time filter that leverages a capacitance at the output of the mixer 116 in the mixer-first receiver frontend 104. The integration of low-power digitally-assisted analog components in the frontend 104 enables large-scale adaptation of the receiver 110, as well as facilitate a low power profile.

Figure 2:
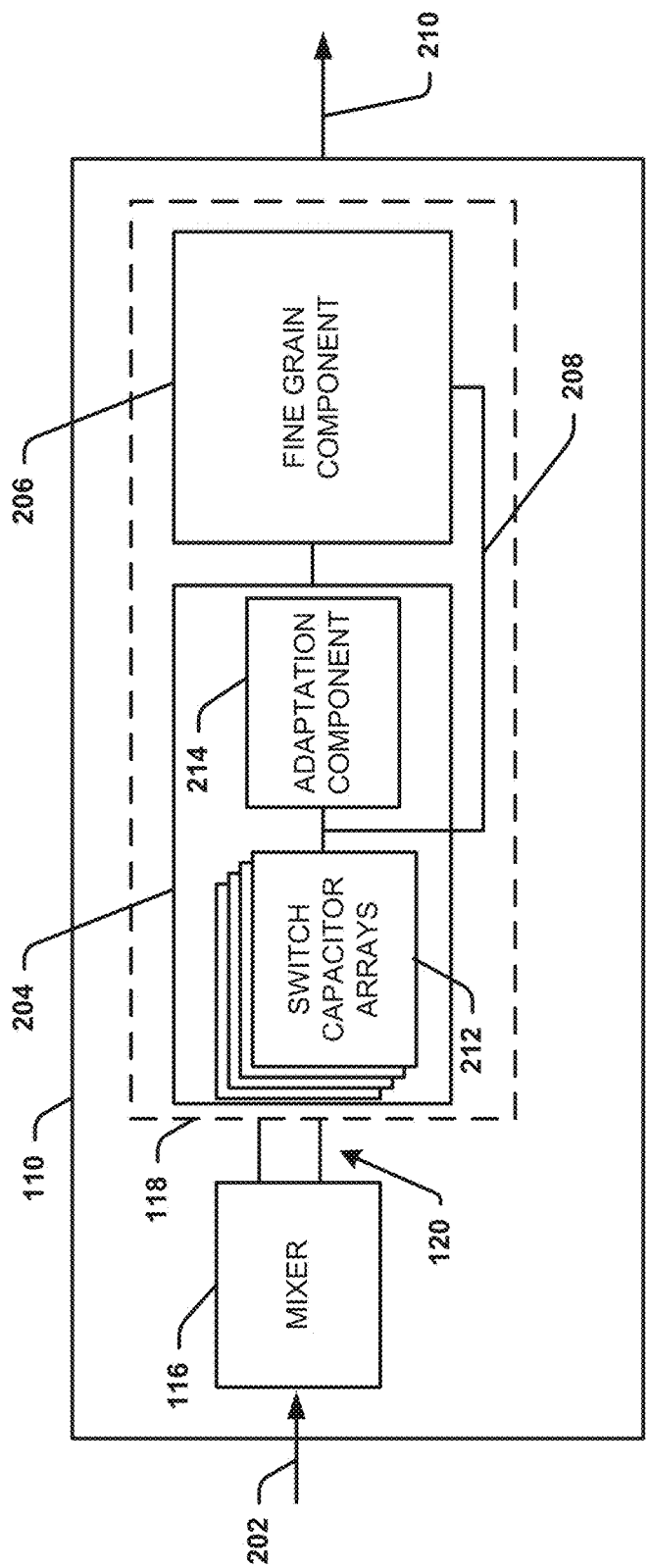
FIG. 2 is an example of a mixer-first receiver with a hybrid ADC filter component in accordance with various aspects described.

FIG. 2 illustrates an example receiver (e.g., a mixer-first receiver) that adaptively generates analog-to-digital conversion and filtering at the same time within the first stage of the two stage component (e.g., H-ADCF component 118). The receiver 110 can operate to dynamically trade off energy for signal-to-noise ratio (SNR) or SNR slack in order to achieve significant power savings based on the input signal, signal properties or one or more criteria. The receiver 110 comprises similar components as disclosed above in the mixer 116, signal path 120 and the H-ADCF component 118, as well as other components, such as the coarse grain component 204 and the fine grain component 206.

For example, the coarse grain component 204 can operate with the fine grain component 206 to adjust a signal frequency or property to a certain target level within a certain resolution via the switch capacitor arrays 212. For example, the base band signal can be delayed or offset in phase or amplitude to match or closely resemble in granularity an oscillator or other reference signal. The coarse grain component 204 accordingly can modify/adjust the output of the switch capacitor array 212 being received via the signal path 120 to be within a certain coarse resolution threshold or range.

The resolution or a resolution threshold, for example, can refer to a bit depth, or a number of bits of information for each sample related to filtering or conversion from the analog domain to the digital domain. The bit depth can limit the signal-to-noise ratio (SNR) of the reconstructed signal to a maximum level determined by quantization error. Quantization noise can be a model of quantization error introduced by the sampling process during analog-to-digital conversion (ADC), and, for example, can be a rounding error between the analog input voltage to the ADC and the output digitized value. The noise can be nonlinear and signal-dependent, and further include one or more blocker signals or interference signals affecting the signaling path. The signal path 120 can be a differential signal pathway with different phase or amplitude components at each, respectively, or a single path. The fine grain component 206 can further operate in a second stage to further sample the residue of the switch capacitor array 212 to a resolution/resolution threshold that is variable (e.g., finer (more precise) than the coarse resolution) for quantizing the sampled static residue at the SAR output of the switch capacitor arrays 212.

The coarse grain component 204 comprises the switch capacitor array 212 integrated with an adaptation component 214. The coarse grain component 204 receives a baseband signal from the mixer 116, which is generated from a down conversion of the received analog signals from an antenna (e.g., antenna 106). The switch capacitor array 212 then filters and converts the base band signal via switching control and criteria detection by the adaptation component 214.

For example, the switch capacitor array 212 can include multiple arrays of switching capacitor banks, in which the capacitors of each bank and each array can be activated or switched in connection by the adaptation component 214 based on one or more criteria in order to facilitate a dynamic/real time operation of filtering and conversion together. The criteria can be actively monitored and detected, including, for example, a blocker signal strength, a signal to noise ratio, data related to a channel estimation (e.g., a channel quality indictor (CQI), or a channel state information (CSI)), a power level, an operating frequency band of the input signal, or other signal related property.

Each capacitor bank (one or more capacitors) of an array 212 or the complete array 212 can be dynamically activated to control the generation of one or more polynomial coefficients for signal processing in the filtering and conversion operations, while each array can be activated to correspond with a filtering operation or a conversion operation, respectively. In some situations, one or more arrays can be activated for filtering, while one or more other arrays are activated for conversion at the same time. In other situations, up to all of the arrays could be activated at one time for conversion or up to all of the arrays could be activated at one time for filtering.

The switching capacitor arrays 212 can operate to generate a discrete impulse response filtering (e.g., a finite impulse response (FIR) filtering, an infinite impulse response (IIR) filtering, or the like), which can be varied in type depending on the configuration or activation of various unit capacitors or switch capacitors of each activated array based on criteria being detected. The capacitors of each array can be digitally controlled via the adaptation component 216, for example, in order to adjust the filter response as either a FIR filtering, a IIR filtering or both at the same time or a sequential pattern based on the input signal properties, other criteria detected at the inputs, or channel estimation data. Closing or connecting sampling switches for each switch capacitor array 212 can allow selective activation of the capacitor banks to provide the filter output as a residue for coarse digitization or quantization. In particular, the coarse digitization or quantization can be generated using a 5-bit success approximation (SAR) ADC (illustrated in FIG. 3), for example, as part of the signal processing path 120 of the coarse digitized quantization output.

The adaptation component 214 can receive the SAR residue as an output of the switch capacitor arrays 212. The adaptation component 214 can further control the conversion operations to a coarse quantization output that can then be passed along to the second stage of the H-ADCF component 118 to the fine grain component 206. The fine grain component 206 also receives the SAR residue from the output of the switch capacitor arrays 212 via the feedforward path 208 to generate the fine grain quantization output. The fine grain component 206 can also be adaptively coupled via control of the connection of the feedforward path 208 by the adaptation component 214 based on the detected criteria, such as a signal power satisfying a predetermined threshold, for example. In situations where the signal power is above the predetermined threshold of a signal power, then the fine grain component 206 can be adaptively disconnected from the feedforward path 208 by the adaptation component 214, for example.

The H-ADCF component 118 can generate a digital output 210 that consumes about 4.6 mW in 14 nm CMOS while it compensates for noise, nonlinearities, and signal blockers, resulting in about >44% lower power than what would typically be implemented by using a very high resolution ADC in the receiver 110 architecture in one simulation. When signal power is strong, the second VCO stage as the fine grain component 206 can be disabled resulting in even lower power consumption of about 2.5 mW, for example.

Figure 3:
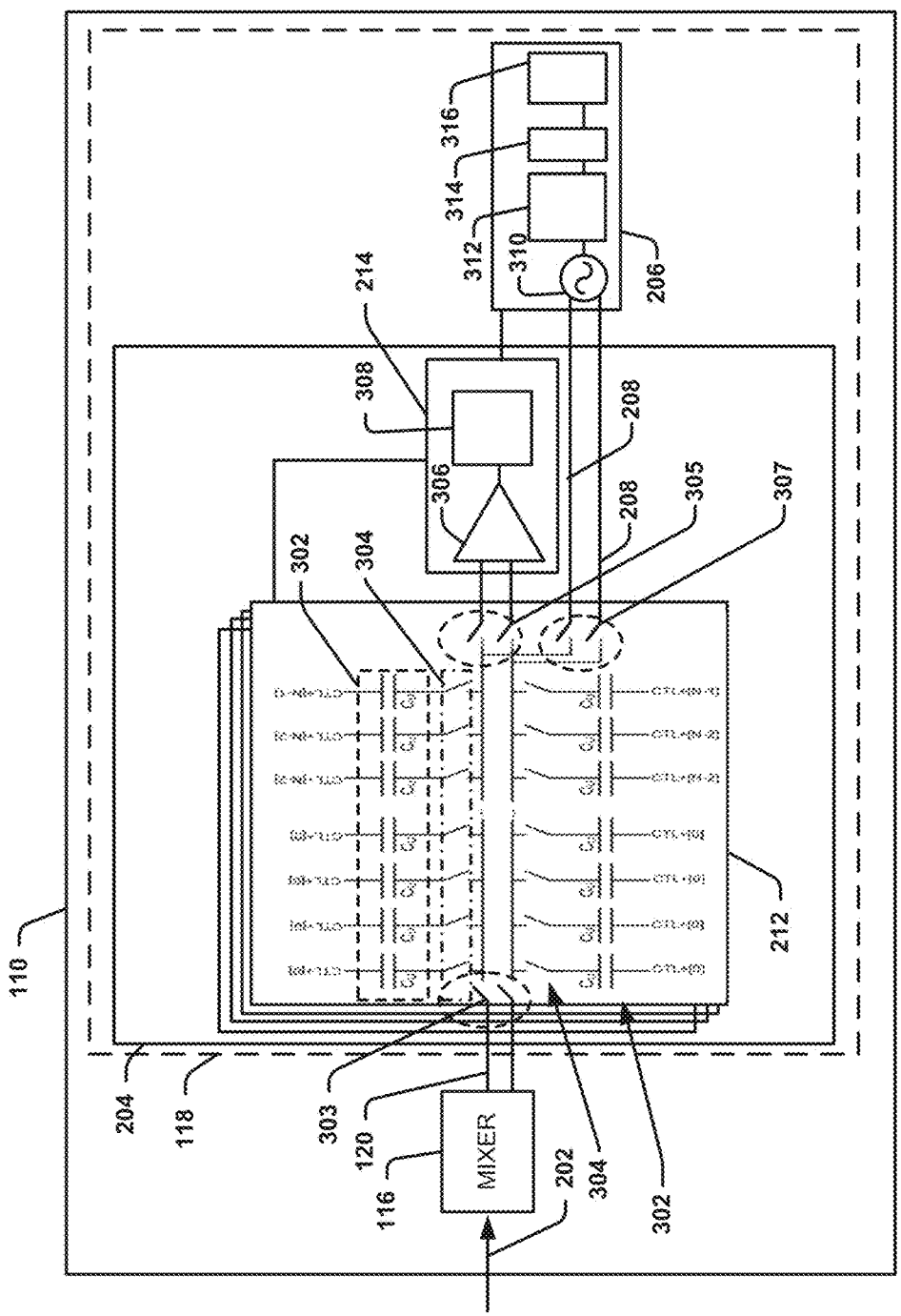
FIG. 3 is another example of a mixer-first receiver with a hybrid ADC filter component in accordance with various aspects described.

Referring to FIG. 3, illustrated is another example of the H-ADCF component 118 for adaptively generating analog-to-digital conversion and filtering at the same time or concurrently. Similar to the example above, the H-ADCF component 118 can operate in a mixer-first receiver, in which the mixer 116 directly receives analog signals to process into a down converted base band signal.

The coarse grain component 204 of the hybrid ADC filter component 118 can directly receive the base band signal from the mixer 116, and further process the base band with filtering and conversion processes operating at the same time. The coarse grain component 204 comprises the switching capacitor arrays 212, each comprising sets of switching capacitors or capacitor banks 302 with switches 304 controlled for activating each switching capacitor 302. The switching capacitors or banks of the arrays 212 can be connected to a single signal path line 120 or a differential signal path line 120, for example, for controlling both filtering and conversion of the base band. The switching capacitors 302 as well as the activation of each array can be digitally activated or inactivated via the switches 304 and switches 303, respectively, as controlled by the adaptation component 214.

The adaptation component 214 can control each set of switches 303 and 304 in order to adjust the filter response as either a FIR filtering, a IIR filtering, a combination thereof, or a sequential pattern based on the input signal properties, other criteria detected at the inputs, or channel estimation data (e.g., CSI, CQI, signal power, operating band frequency or the like). Each switching capacitor array 212 can be connected in-line or activated by the control of one or more switches 303. Likewise, each individual capacitor or capacitor bank 302 can be selectively controlled by one or more sets of switches 304 in order to generate the blocker filter coefficients for filtering and also conversion. The switches 305 can be controlled as well by the adaptation component 214 to dynamically interleave or sequentially overlap filtering and conversion with an integrated converter/comparator 306, and selectively coupled an array 212 with the comparator 306 for conversion while another array or capacitor bank is operational for filtering at the same time. Furthermore, the switches 307 can be dynamically operated for coupling or connecting the fine grain component based on the criteria, which can be detected by the adaptation component 214 or other component of the receiver 110.

In one aspect, the switching capacitor arrays 212 can be selectively activated for different operations (e.g., filtering or conversion) at the same time so that one array 212 can be activated for filtering while another can be activated and connected to the comparator/amplifier 306 for conversion. In this manner, the adaptation component 214 can couple the comparator 306 to the selected array 212 for integrated conversion, while another array 212 or capacitor bank for the array is activated for filtering. At the same time, one or more other switching capacitor arrays 212 can be activated to couple to the comparator 306 for the conversion operation. The same switching capacitors 302 can therefore be used for filtering and conversion operations at the same time or concurrently as part of the H-ADCF component 118 of a receiver.

In another aspect, closing or connecting sampling switches for each switch capacitor array 212 can provide the filter output as a successive approximation (SAR) residue for coarse digitization or quantization to be generated via the comparator 306, which is coupled to the logic activation component 308. The coarse digitization or quantization can be generated, for example, using a 5-bit SAR ADC, for example, as part of the signal processing path 120 of the coarse digitized quantization output.

One or more of the switches 304 can be controlled by the activation component of the adaptation component 214. The output of the comparator 306 from the conversion operation, in conjunction with one of the coupled switching capacitor arrays 212, can be provided to the logic activation component 308, which dynamically analyses the digital quantized signal and operates to control switches, activation and connection operation according to interleaving processes. The switches controlled by the logic activation component 308 include switches 303 at the input terminals of the signal processing path 120 to the switching capacitor arrays 302, as well as switches 305 and 307 for each of the differential signalling paths to the adaptation component 214 and the fine grain component 206, respectively. The switches 303 can be selectively activated via the logic activation component 308 to selectively connect the signal path 120 to one or more arrays for filtering operation of the base band signal. Each array 212 can also have different capacitances associated with different capacitors for implementing an impulse response with one or more different coefficients to enable the filtering based on the signal criteria, which can further be detected by the logic activation component 308 or another component of the receiver.

As stated above, the H-ADCF component 118 can operate as a two-stage ADC. The two stages can comprise a successive approximation (SAR) ADC as the coarse grain component 204 and a VCO-based first order delta sigma ADC as the fine grain component 206. The coarse grain component 204 as the first stage comprises the switching capacitor arrays 212 with capacitors along each differential signal path or branch connected to an amplifier or a comparator 306 of the adaptation component 214. The comparator 306 is further coupled to the logic activation component 308, which operates to selectively activate the switching capacitor arrays 212 or the capacitor banks within the arrays in order to simultaneously generate a discrete time filtering operation for blocker rejection of the baseband signal and a low-noise amplification gain with the ADC comparator 306 for (digital) conversion.

The large DAC capacitor, typically utilized for a SAR ADC implementation, can be eliminated by reusing the charge generated by the switching capacitor arrays 212 as the large baseband capacitor at the mixer output or path 120. The arrays 212 generate a low power SAR ADC with the comparator 306 in the first stage. As such, the first stage of the H-ADCF component 118 reuses the baseband filter capacitors of the switching capacitor arrays 212 at the mixer output, substituting as a feedback DAC for conversion operations, namely analog-to-digital conversion.

Charging the large DAC capacitance in a conventional SAR ADC can be a major source of power consumption. Eliminating this DAC by reusing the mixer output for a first order filter capacitor can keep thermal sampling noise low. The capacitance being formed by selective activation of the arrays 212 and corresponding capacitors can be divided into unit capacitor cells or banks to provide flexibility and allow integration of a programmable discrete-time filter into the H-ADCF component 118 with the comparator 306.

Consequentially, the first stage provides coarse digitization via conversion operations in conjunction with filtering. Activation of the filtering capacitors 304 or the arrays 212 can be modified according to various criteria in order to digitally program the filtering. For example, a FIR filtering operation via the selection of the arrays 212 and activation of the capacitors therein can be generated via control of the switches 304 in response to the criteria. Thus, a configurable FIR filter can be dynamically and adaptively formed on-the-fly via the selective activation of the arrays and capacitors of each array 212 to dynamically prevent blocker aliasing while maintaining linearity based on, for example, also the operating band of the input analog signal. A configurable FIR filter bank via the arrays 212 or capacitors of each array 212 being selectively activated enables a design and operation with resolution and power to be easily scaled based on the channel characteristics or other criteria, providing adaptability. Other types of impulse response filtering can also be dynamically formed or activated via switching control (e.g., IIR filtering or other filtering) to prevent aliasing large blockers into the signal base band based on one or more criteria.

In another embodiment, four time-delta sigma ($\Delta\Sigma$) interleaved filters can be activated as corresponding with each of the switching capacitor arrays 212 to account for the SAR and VCO conversion time. Another number than four arrays or interleaved filters can also be selectively activated for dynamically interleaving filtering and conversion operations with the same capacitors. As stated above, the H-ADCF component 118 can consume only about 4.6 mW in 14 nm CMOS while it compensates for noise, nonlinearities, and blockers, resulting >44% lower power than what would typically be required in this scenario using a high resolution ADC. Because the LNA has been removed, the front-end can easily scale with technology or different applications and offer a lower cost front-end. The receiver 110 also enables a highly adaptable receiver front-end due to its mixed-signal nature.

The second stage of the H-ADCF component 118 comprises the VCO-based first-order delta sigma ADC formed by the fine grain component 206, comprising an oscillator 310, a phase detector 312, a transfer function component 314, or an alignment and combination component 316 for final offset (phase or delay) and signal alignment for gain mismatches between the SAR and VCO stages, for example. The oscillator 310 can directly receive the SAR residue from the coarse grain component 204 via the control of the switches 307 by the logic activation component 308. When signal power is strong, the second VCO stage can be disabled resulting in even lower power of 2.5 mW. As such, the logic activation component 308 of the adaptation component 214 can disable the switches 307 in response to detecting that the signal power satisfies a predetermined threshold in the signal processing path, the output of the switching capacitor arrays 212, the output of the comparator 306 or otherwise. By operating only on the SAR residue via the switches 307, the VCO-based first-order delta sigma ADC formed by the fine grain component 206 can relax noise requirements along the processing components.

The fine grain component 206 can be configured to oversample the SAR residue so that operating as a selectively activated VCO-based first-order ADC in the second stage (e.g., as $\Delta\Sigma$ stage) relaxes noise requirements. Oversampling can refer to sampling the SAR residue signal with a sampling frequency that is higher than the Nyquist rate, which can be about twice the highest frequency in the SAR residue signal. Without explicit amplification in the receiver, the noise figure can be higher than normal. However, oversampling in the VCO-based ADC in the second stage can lessen the need for mitigating the noise, allowing noise suppression to be handled at the application level or in the digital domain.

In another embodiment, the fine grain component 206 achieves low-noise gain by amplifying the SAR residue using the voltage to frequency gain of the VCO 310. Rather than use a feedback amplifier to ensure gain, linearity, and stability targets are met, a low-noise gain is thus achieved by amplifying the SAR residue at the fine grain component 206 using the voltage to frequency gain of the VCO 310. Additionally, the linearity is improved further by directly receiving the SAR residue output, which is small, at the fine grain component 206. As a result, high gain and low noise can be achieved at the expense of power by using large input devices, while nonlinearities such as the input-referred DC offset can be compensated later in the digital domain. The power consumption can thus be scaled via control of the resolution at the filter stage by using a variable number of parallel input components (e.g., capacitors of the array 212) to build the VCO's input stage via the adaptation component 214.

The H-ADCF component 118 of FIG. 3 integrates low-noise amplification and blocker filtering functionalities into one component as a mixed-analog digital hybrid ADC and FIR filter for mixer-first receivers. A portion of the large baseband filtering capacitance generated by the switching capacitor arrays 212 at the mixer output can be selectively activated as an impulse response filter such as a discrete-time FIR filter or discrete-time IIR filter via the adaptation component 214. The filtering operation of the arrays 212 generates the input to a capacitive DAC based SAR ADC that is selectively configured by the selective activation of the switching capacitor array 212 via the adaptation component 214, which can reduce the need of the large capacitive DAC from typical feedback loops in DAC based SAR ADCs by making the switching capacitor array 212 capacitances part of the filtering capacitance.

The error residue from the SAR conversion via operation of the arrays 212 and the adaptation component 214 is in turn quantized by the fine grain component 206, operating as a high-sensitivity VCO-based first-order $\Delta\Sigma$ ADC in the second stage of the H-ADCF component 118. The second stage VCO-based ADC 206 reduces the noise suppression requirements, allowing noise cancellation to be handled either in the digital domain or at the application level. The filtering generated by the arrays 212 can be performed with a filter resolution that can be re-configured dynamically (via the adaptation component 214). The resolution and power consumption of the H-ADCF component 118 are each able to be modified dynamically via the adaptation component 206 by adaptively integrating the filtering operation (e.g., selectively forming a FIR filter) via the array 212 based on signal or channel criteria.

In one example, the logic activation component 308 of the adaptation component 214 selectively modifies the power consumption and resolution of the filtering and conversion operation based on a channel estimation, a signal power measurement, a frequency operating band of the input signal, a noise level, the blocker signal strength of a blocker signal or the like. In response to an input signal satisfying a threshold of one or more of the criteria, the logic activation component 308 can re-configure or modify the resolution or power consumption of the arrays 212 to efficiently generate filter coefficients for adequate signal processing via filtering and conversion operations at the same time.

In order to detect low-power Wi-Fi signals, for example, low-noise amplification can be utilized to achieve a low noise gain by amplifying the SAR residue using the voltage to frequency gain of the VCO 310. For example, the VCO 310 can be a current-starved ring oscillator, where the noise of the VCO 310 can be determined by both the oscillator noise and the noise generated by the input pair. The transconductance of input transistors (not shown) can be high enough to meet the VCO resolution and input-referred noise requirements. Additionally, the linearity of this topology can be improved over a conventional VCO-based ADC because the SAR residue is small. As a result, high gain and low noise can be achieved at the expense of power by using large input devices, while nonlinearities such as the input-referred DC offset can be compensated later in the digital domain. As such, the power consumption can be scaled with resolution by using a variable number of parallel input devices to build the VCO's input stage via the arrays 212. The oversampling by the VCO-based ADC relaxes the noise requirements, and noise can be reduced further at the application level using multiple spatially distributed receivers in a beamforming radio array. Moreover, the reduced design time and improved scalability of the digital-intensive approach offers distinct advantages over typical analog front-ends.

Figure 4:
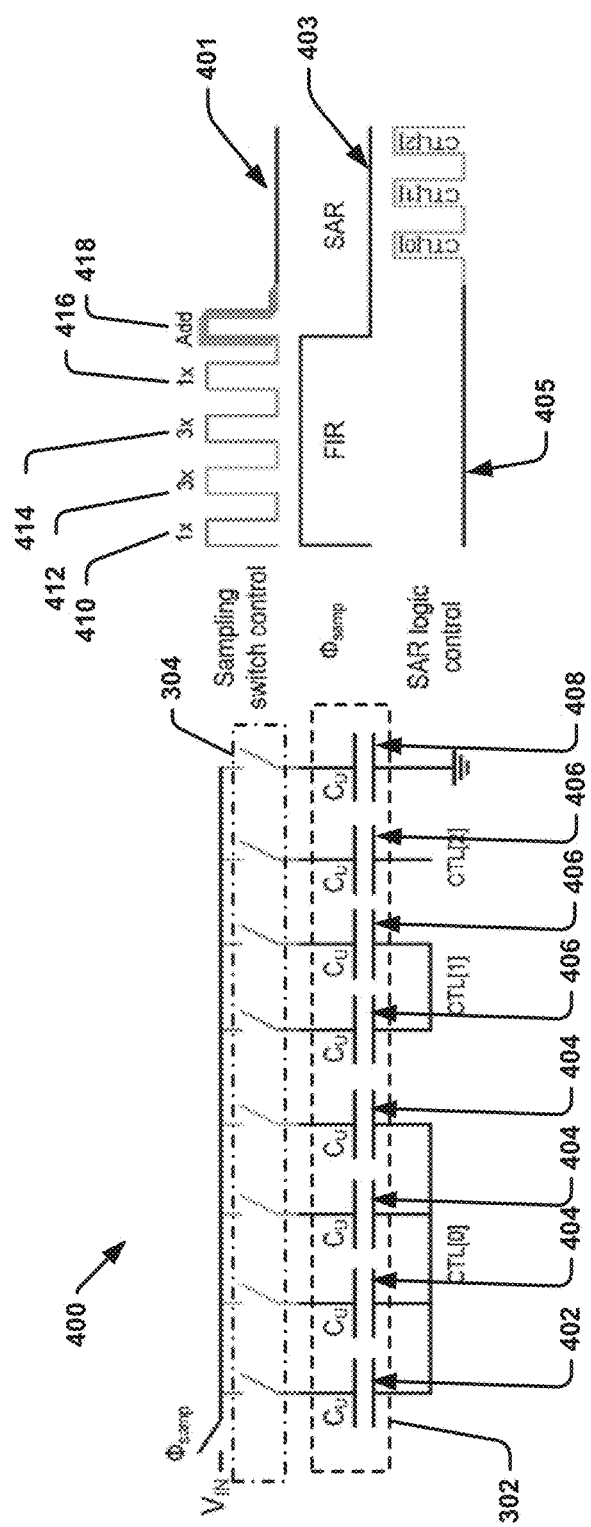
FIG. 4 is an example of a time sequence for a capacitor array of a hybrid ADC filter component in accordance with various aspects described.

Referring now to FIG. 4, illustrated is an example of timing sequences corresponding with an example switching capacitor bank 400 of the switching arrays 212 in accordance with various embodiments herein. In one example, FIG. 4 illustrates how a FIR filter with coefficients weighted

[1 3 3 1] could be dynamically activated. For example, a single clock cycle is demonstrated via the clock cycle or period waveform 403. A clock cycle or period can refer to the time between two adjacent pulses of an oscillator or clock that can set the tempo for signal processing or sampling.

In one embodiment, the H-ADCF component 118 of FIG. 3, through the integration and activation of one or more arrays of capacitor banks 302 by switches 304, can operate to utilize the same capacitors 302 or array 212 for filtering operation (e.g., FIR) at one portion or one half of the clock cycle 403 as for conversion operations in another portion or half of the same clock cycle 403. Concurrently, in another half of the clock cycle 403, a conversion operation (e.g., SAR ADC) can be generated with the same capacitors as used in the filtering (e.g., FIR) portion of the clock cycle 403. As such, the same capacitors 302, or same switching capacitor array 212 being activated can generate filtering and conversion operation in the same clock cycle.

Figure 5:
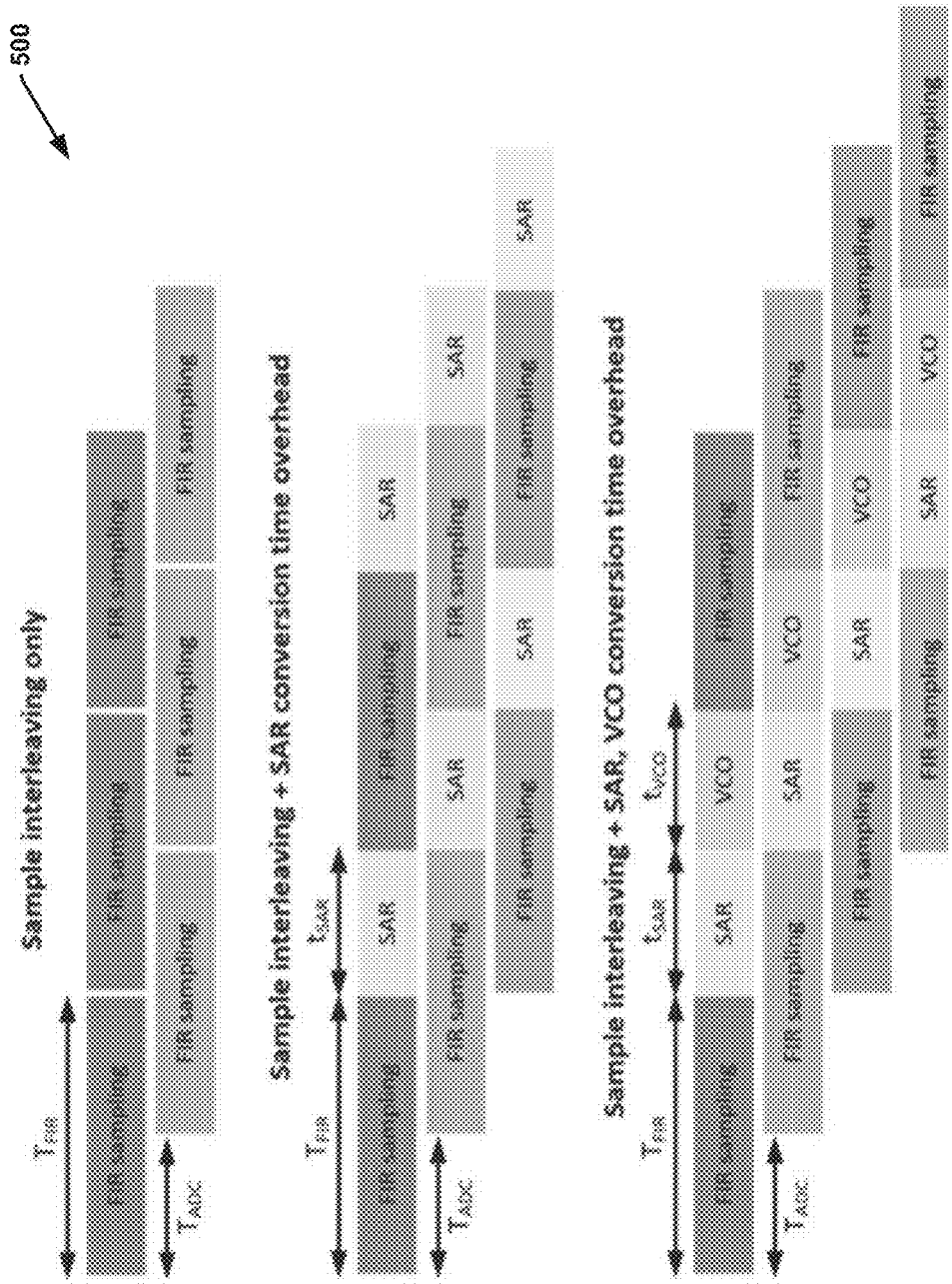
FIG. 5 is an example of interleaving filtering and conversion operations in accordance with various aspects described.

In another embodiment, interleaving (as illustrated in FIG. 5) can be generated via the adaptation component 214 so that capacitors are being used for both filtering and conversion operations, and additionally the arrays are being activated for the different operations simultaneously. For example, a first capacitor array of the arrays 212 can be activated for filtering operation, while simultaneously a different or second capacitor array of the arrays 212 or different capacitor bank can be activated for conversion (SAR) operation to receive the residue of the first capacitor array and generate digital conversion, such as by a sequential overlapping of filtering and conversion phases. A third capacitor array, for example, can be activated to generate filtering simultaneously with this conversion, and the first capacitor array can be used for conversion. Therefore, the same capacitor array 212 can be used for both filtering and conversion operations within a same clock cycle, while filtering and conversion operations can be performed simultaneously in different arrays or capacitor banks.

Referring back to FIG. 4, in another embodiment, the sampling switch control can be seen in the waveform 401, in which each pulse operates to control the activation of corresponding switches 304 according to the coefficient being selected by the adaptation component 214, for example. The first coefficient (1×) operates one capacitor bank 402 and is controlled by the pulse 410 during the filtering stage of the clock cycle 403. The second coefficient (3×) is selected to activate three capacitors a capacitor bank 404 for a greater value and is controlled by the pulse 412 during the filtering stage of the clock cycle 403. The third coefficient (3×) is selected to activate the capacitors of capacitor bank 406, and is controlled by the pulse 414 during the filtering stage of the clock cycle 403. Likewise, the fourth coefficient (1×) is selected to activate the capacitor(s) of capacitor bank 408 and is controlled by the pulse 416 during the filtering stage of the clock cycle 403. Each pulse can correspond with the control of more or less switches of a capacitor bank 302 of an array 212. An additional stage 418 can further be utilized to add the amount sampled onto the capacitance to get an actual filtered FIR output based on signal criteria, the application of the receiver or the like, for example.

The FIR filter can include many unit capacitors or capacitor banks 302 that can be controlled digitally to adjust the filter response. Closing all of the sampling switches can generate the filter output, which is coarsely digitized using a 5-bit SAR ADC, for example. The final residue is then digitized using a VCO-based first-order ΔΣ converter as the fine grain component 206. Four time-interleaved filters can be activated by the arrays 212 to account for or adjust for the SAR and VCO conversion time in the signal processing; however, another number of arrays 212 can also be implemented as well.

Typically, mixer-first receivers can include a large capacitor (tens of pico-farads) after the mixer to provide first order filtering and set the input impedance. The FIR filter generation has to be selected sufficiently to prevent aliasing large blockers onto the signal band, and maintain sufficient linearity to detect even small signals at the same time. The filter rejection operations (filtering) can have important implications for the ADC sample rate relative to the FIR filter sample rate, and tolerable levels of component mismatch and timing error, which can also be utilized or determined as criteria for modifying the resolution or power consumption levels of the H-ADCF component 118 or components therein via the adaptation component 214.

A high-resolution capacitive DAC-based SAR ADCs could have to utilize a large amount of capacitance to keep thermal sampling noise low for conversion operations; however, this is often a major source of the converter's power consumption. As such, the H-ADCF component 118 enables a low-power SAR implementation by reusing the baseband filtering capacitor as a replacement to the DAC of a low-sampling-noise SAR ADC. Dividing the capacitance into many unit capacitor cells via the arrays 212 of switching capacitor banks 302 provides additional flexibility to integrate a programmable discrete-time filter into the ADC operation with the converter/comparator/amplifier 306.

The coefficients being generated in FIG. 4 illustrates an example of how an FIR filter, for example, with coefficients weighted e.g., as [1 3 3 1] would be implemented. During the FIR sampling phase of the clock cycle 403, a variable number of unit (individual) capacitor cells are selectively switched at the FIR filter sampling frequency. The number of unit capacitor cells selected at each period sets the FIR filter tap coefficients. When all switches are recombined, for example, the total filtered output is generated and the SAR conversion can be performed.

To allocate time for signal conversion and support ADC sample rates faster than the FIR sampling rate, multiple time-interleaved capacitor banks or multiple arrays of banks 304 can be selectively activated by the adaptation component 214, for example. The SAR control pulses 406, for example, can be generated during the SAR phase of the clock cycle 403. After the SAR conversion is complete, the remaining residue is measured using a VCO-based ADC. This type of ADC achieves first-order noise shaping by operating the first-order ΔΣ loop as an equivalent to a feed-forward path. The integral of the VCO frequency is simply given by the VCO phase, which is easily quantized such as via the phase detector 312, a transfer function component 314, and an alignment and combination component 316, for example, which can be performed in the digital domain.

Referring again to FIG. 5, illustrated is an example of interleaving processes 500 that can be generated with filtering and conversion operations in accordance with various embodiments. To ensure that FIR samples are ready for analog to digital conversion faster than the FIR sampling frequency, two stages of time interleaving can be controlled via the logic activation component 308. An additional stage of interleaving can also be generated for SAR conversion, with a further additional stage to facilitate continuous VCO integration, as illustrated.

Interleaving can be generated via the adaptation component 214 so that capacitors or capacitor banks of one or more capacitors of an array 212 are activated for both filtering and conversion operations. The arrays 212 can be separately and independently activated additionally for the different operations simultaneously, while the capacitors of each array can then also be used for both filtering and conversion operations. Different capacitor arrays of the arrays 212 can be activated for filtering operation, while a different capacitor array of the arrays 212 can be activated for conversion (SAR) operation to receive the residue of the first capacitor array and generate digital conversion, such as by an overlapping of times. A third capacitor array can be activated to generate filtering simultaneously with this conversion, and the first capacitor array can be used for conversion. Therefore, the same capacitor array can be used for both filtering and conversion operations within a same clock cycle, and filtering and conversion operation can be performed simultaneously. Each of the arrays can be coupled together in a parallel configuration, for example, and each of the sets of switches controlling a coupling of the arrays to one another, the signal path 120, the fine grain component 206, or the adaptation component 214 for conversion can include any number of switches thereat and are not limited to one or two switches in the examples illustrated.

Figure 6:
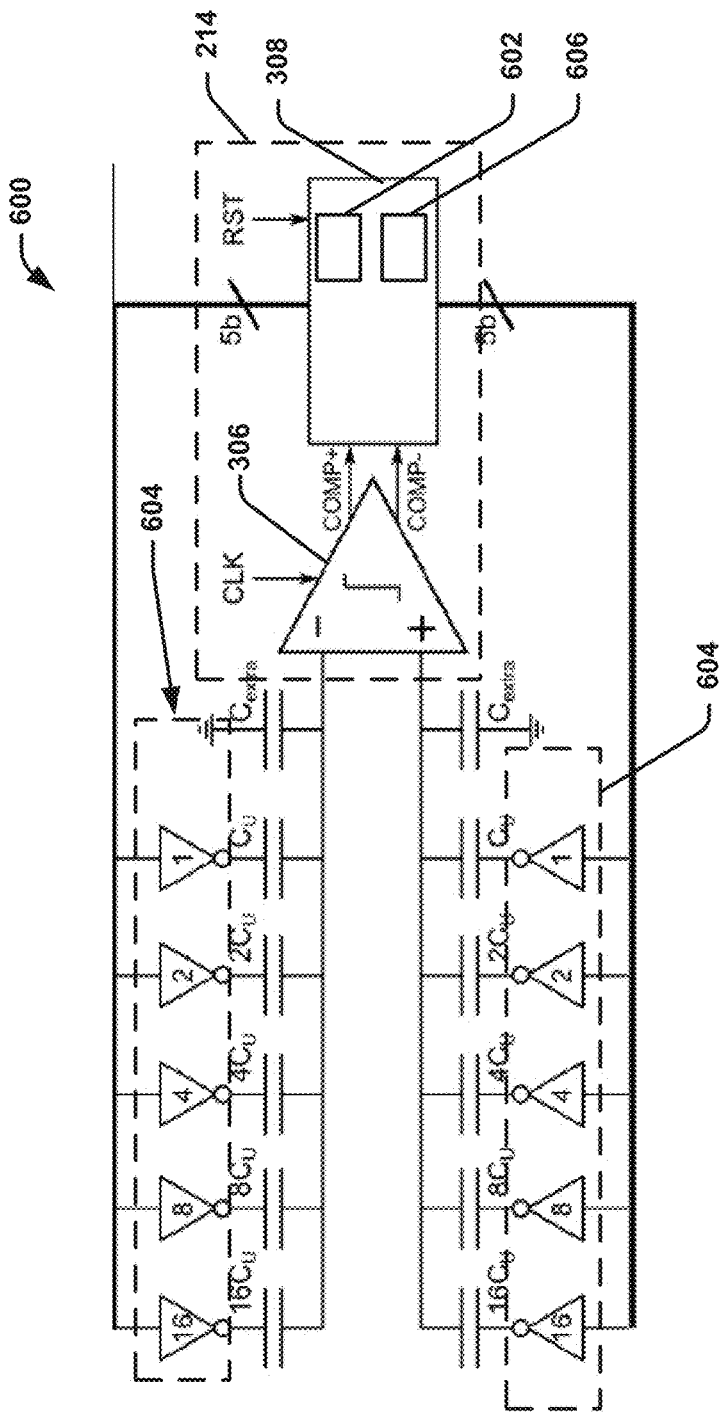
FIG. 6 is a block diagram of a first stage of a two stage hybrid ADC filter component in accordance with various aspects described.
Figure 7:
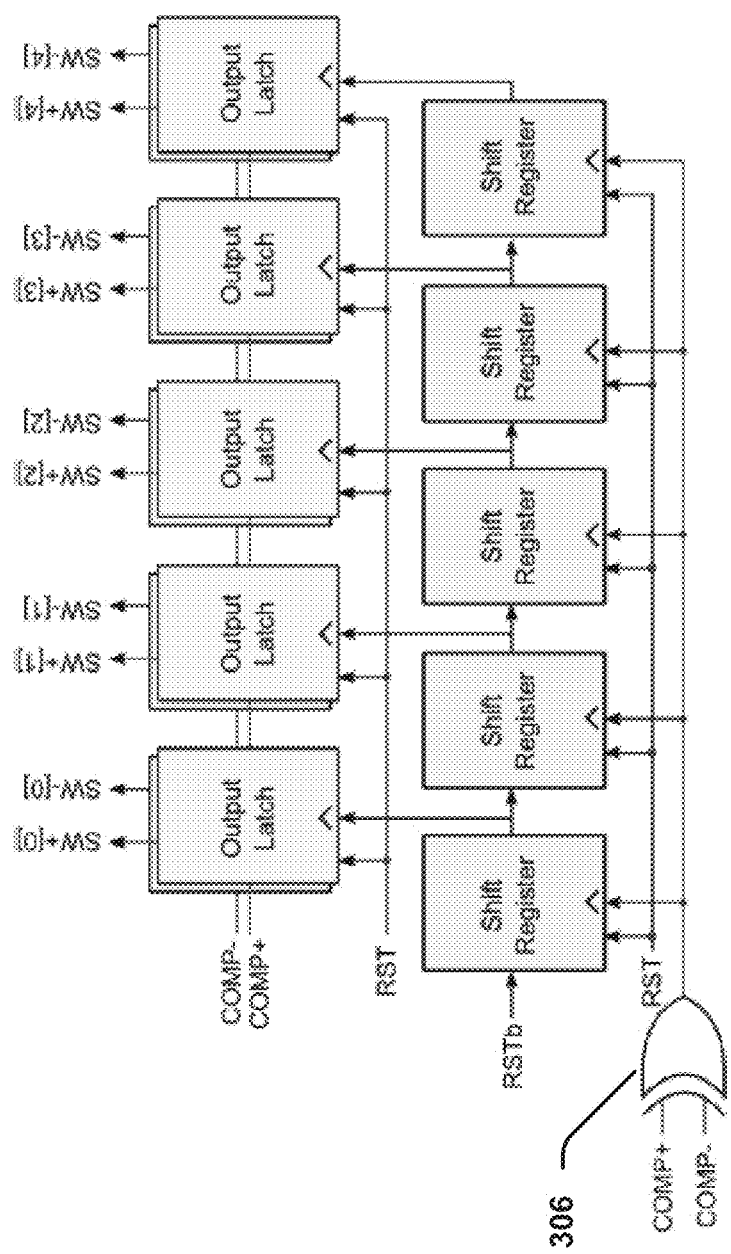
FIG. 7 is an example of logic activation component for a hybrid ADC filter component in accordance with various aspects described.

FIG. 6 illustrates an example of the first stage SAR switching control for generating integrated filtering and conversion operations in accordance with various embodiments. In this switching control scheme, the input signal can be sampled onto the comparator input while the most significant bit (MSB) capacitor bottom plate can be held at a source voltage $V_{SS}$, and the remaining capacitor bottom plates can be fixed to a drain voltage $V_{DD}$, for example. During the conversion process, the capacitor bottom plates can be latched to the comparator result, allowing the logic of the logic activation component 308 to be implemented as illustrated in FIG. 7. The extra capacitance shown in FIG. 6 can be used to tune the full-scale ADC range. Alternately, this could be accomplished by reducing the supply on the inverters drawn.

A detection component 602 of FIG. 6 can be further configured to detect one or more of a blocker signal strength, a signal-to-noise ratio, a channel estimation datum or a power level. The activation component 214 is further configured to selectively activate the switching capacitor arrays or the capacitor banks of each array to selectively modify a resolution of the discrete-time filtering operation while also generating the conversion based on the one or more criteria comprising at least one of the blocker signal strength, the signal to noise ratio, the channel estimation datum or the power level. The logic activation component 308 can receive the detected criteria, either from the input signals, data from a channel estimation, the SAR residue, a memory or data store, or other signal property, as detected from the detection component 602.

In another embodiment, a power scaling component 606 of the adaptation component 214 can be configured to determine whether to activate or deactivate the voltage controlled oscillator (VCO)-based first order delta sigma ADC of the fine grain component via a VCO control switch 307 based on one or more channel characteristics received in a channel quality indictor, or a channel state information, and to disable the VCO-based first order delta sigma ADC in response to a signal power satisfying a predetermined threshold. In addition, the power scaling component 606 can operate as part of or in conjunction with the adaptation component 214 to activate one or more arrays 212, capacitor banks 304 or selective capacitors in order to meet a pre-defined power consumption level based on the criteria detected via the detection component 602, for example.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 8:
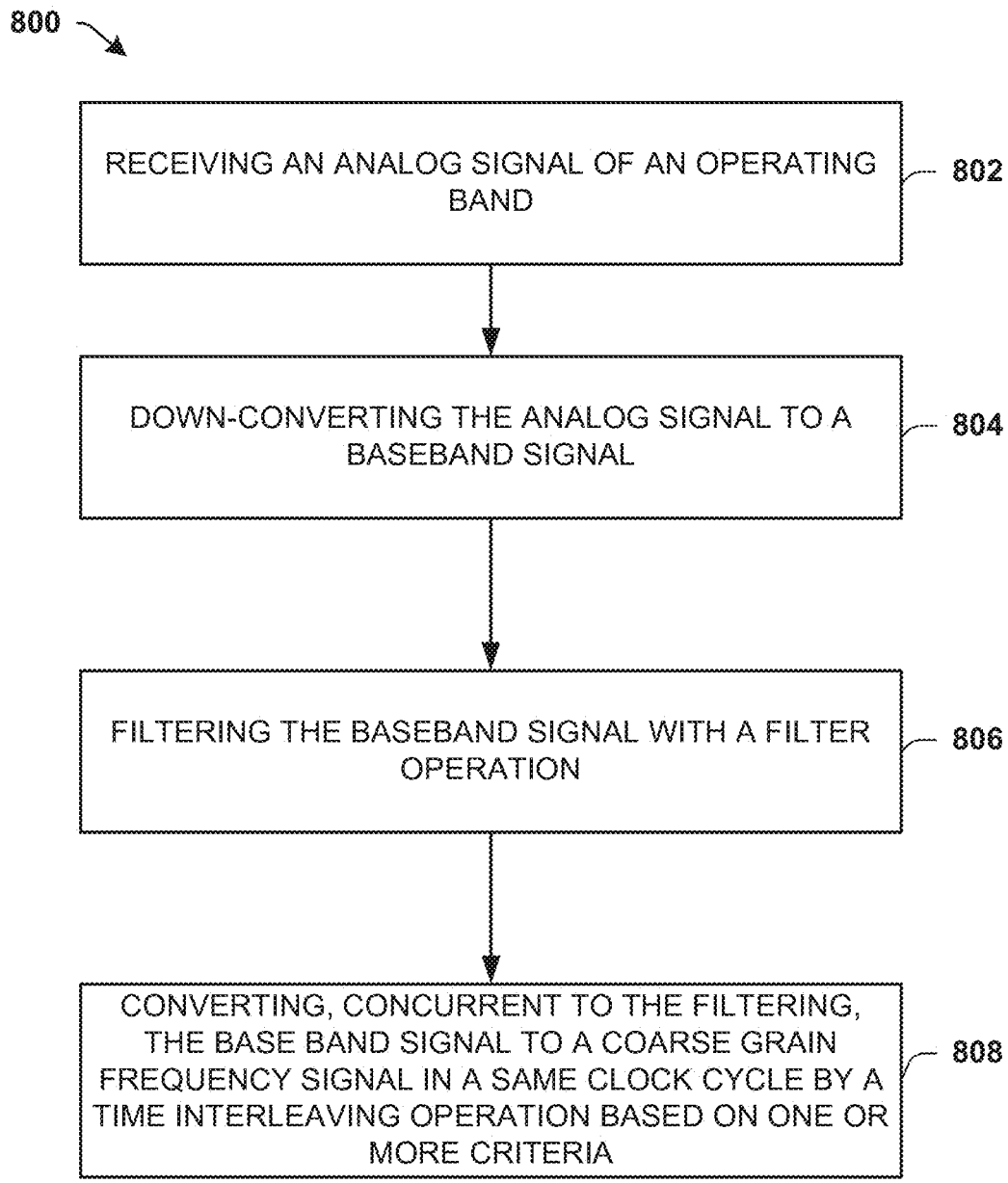
FIG. 8 is a flow diagram illustrating a method of mitigating nonlinear distortion according to various aspects described.

Referring to FIG. 8, illustrated is a method 800 for a method for a mixer-first receiver that operates filtering and conversion operations together via an integrated hybrid ADC filter component. The method 800 initiates at 802 with receiving, via an antenna port, an analog signal of a first operating band.

At 804, the method 800 can include down-converting the analog signal, via a mixer (e.g., mixer 116) of an RF frontend (e.g., frontend 104), to a baseband signal.

At 806, the method 800 can include filtering, via a hybrid analog-to-digital converter (ADC) filtering component (e.g., H-ADCF component 110), the baseband signal of the first operating band with a filtering operation along a signal pipeline.

At 808, the method 800 can include converting, concurrently with or simultaneously to the filtering operation via the H-ADCF component 110, the baseband signal to a coarse grain frequency signal by adaptively generating a conversion of the baseband signal to a digital signal in a same clock cycle (e.g., clock cycle 403) by a time interleaving operation 500 of one or more switching arrays 212 of the plurality of switching capacitor arrays within the same clock cycle, based on one or more criteria.

The method can further include processing, via a voltage controlled oscillator (VCO)-based first order delta sigma ADC (e.g., the fine grain component 206), the coarse grain frequency signal at a successive approximation (SAR) output (e.g., at the switches 307) coupled to a plurality of switch capacitor arrays 212 of the hybrid ADC filtering component 110 by oversampling the SAR output and amplifying a SAR residue of the plurality of switch capacitor arrays 212 based on a voltage-to-frequency gain of a VCO coupled to the plurality of switch capacitor arrays 212 to generate a fine grain frequency signal.

The criteria for selectively controlling the switches 303, 307, 305, 307 can be detected via a detection component 602 coupled to the SAR output along the signal pipeline 120, the one or more criteria comprising a blocker signal strength of a blocker signal or an operating band, for example. In response to the operating band of the input signals change, the activation of the capacitor banks 304 or the switching capacitor arrays can be modified or changed accordingly via the control of the switches via the adaptation component 214, for example. As such, the adaptation component can selectively activate the switching capacitor arrays of the plurality of switching capacitor arrays via a feedback loop or path to a plurality of switches based on the operating band changing from the first operating band to a second operating band that is different from the first operating band.

In another embodiment, the H-ADCF component 118 can selectively activate the switching capacitor arrays 212 of the plurality of switching capacitor arrays via a feedback loop (e.g., the bottom and top paths of FIG. 6 from the adaptation component to the inverters or switches) to a plurality of switches to modify a resolution of the filtering operation by activating a first switching capacitor array of the plurality of switching capacitor arrays to filter the blocker signal while concurrently activating a second different capacitor array of the plurality of switching capacitor arrays to generate the conversion based on one or more channel characteristics received in a channel quality indication (CQI) or a channel state information (CSI).

The method can further include determining whether to activate or deactivate the voltage controlled oscillator (VCO)-based first order delta sigma ADC via a VCO control switch based on one or more channel characteristics received in a CQI or a CSI. The VCO-based first order delta sigma ADC can further be disable in response to a signal power satisfying a predetermined threshold.

Figure 9:
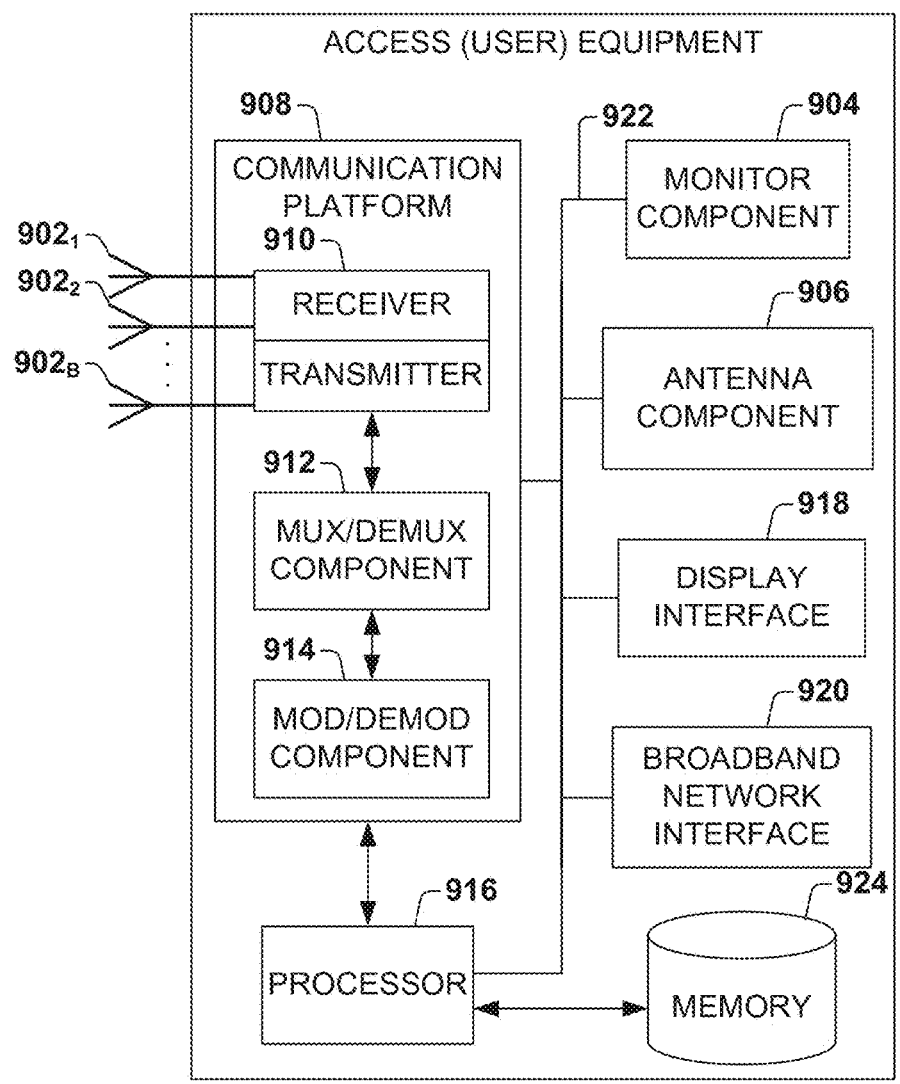
FIG. 9 is another example architecture of a user (access) equipment for implementing various aspects described.

To provide further context for various aspects of the disclosed subject matter, FIG. 9 illustrates a block diagram of an embodiment of access (user) equipment related to access of a network (e.g., base station, wireless access point, femtocell access point, and so forth) that can enable and/or exploit features or aspects disclosed herein.

Access equipment, UE and/or software related to access of a network can receive and transmit signal(s) from and to wireless devices, wireless ports, wireless routers, etc. through segments $902_1$-$902_B$ (B is a positive integer). Segments $902_1$-$902_B$ can be internal and/or external to access equipment and/or software related to access of a network, and can be controlled by a monitor component 904 and an antenna component 906. Monitor component 904 and antenna component 906 can couple to communication platform 908, which can include electronic components and associated circuitry that provide for processing and manipulation of received signal(s) and other signal(s) to be transmitted.

In an aspect, communication platform 908 includes a receiver/transmitter 910 that can convert analog signals to digital signals upon reception of the analog signals, and can convert digital signals to analog signals upon transmission. In addition, receiver/transmitter 910 can divide a single data stream into multiple, parallel data streams, or perform the reciprocal operation. Coupled to receiver/transmitter 910 can be a multiplexer/demultiplexer 912 that can facilitate manipulation of signals in time and frequency space. Multiplexer/demultiplexer 912 can multiplex information (data/traffic and control/signaling) according to various multiplexing schemes such as time division multiplexing, frequency division multiplexing, orthogonal frequency division multiplexing, code division multiplexing, space division multiplexing. In addition, multiplexer/demultiplexer component 912 can scramble and spread information (e.g., codes, according to substantially any code known in the art, such as Hadamard-Walsh codes, Baker codes, Kasami codes, polyphase codes, and so forth).

A modulator/demodulator 914 is also a part of communication platform 908, and can modulate information according to multiple modulation techniques, such as frequency modulation, amplitude modulation (e.g., M-ary quadrature amplitude modulation, with M a positive integer); phase-shift keying; and so forth).

Access equipment and/or software related to access of a network also includes a processor 916 configured to confer, at least in part, functionality to substantially any electronic component in access equipment and/or software. In particular, processor 916 can facilitate configuration of access equipment and/or software through, for example, monitor component 904, antenna component 906, and one or more components therein. Additionally, access equipment and/or software can include display interface 918, which can display functions that control functionality of access equipment and/or software or reveal operation conditions thereof. In addition, display interface 918 can include a screen to convey information to an end user. In an aspect, display interface 918 can be a liquid crystal display, a plasma panel, a monolithic thin-film based electrochromic display, and so on. Moreover, display interface 918 can include a component (e.g., speaker) that facilitates communication of aural indicia, which can also be employed in connection with messages that convey operational instructions to an end user. Display interface 918 can also facilitate data entry (e.g., through a linked keypad or through touch gestures), which can cause access equipment and/or software to receive external commands (e.g., restart operation).

Broadband network interface 920 facilitates connection of access equipment and/or software to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 920 can be internal or external to access equipment and/or software and can utilize display interface 918 for end-user interaction and status information delivery.

Processor 916 can be functionally connected to communication platform 908 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 916 can be functionally connected, through data, system, or an address bus 922, to display interface 918 and broadband network interface 920, to confer, at least in part, functionality to each of such components.

In access equipment and/or software memory 924 can retain location and/or coverage area (e.g., macro sector, identifier(s)) access list(s) that authorize access to wireless coverage through access equipment and/or software sector intelligence that can include ranking of coverage areas in the wireless environment of access equipment and/or software, radio link quality and strength associated therewith, or the like. Memory 924 also can store data structures, code instructions and program modules, system or device information, code sequences for scrambling, spreading and pilot transmission, access point configuration, and so on. Processor 916 can be coupled (e.g., through a memory bus), to memory 924 in order to store and retrieve information used to operate and/or confer functionality to the components, platform, and interface that reside within access equipment and/or software.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a mixer-first receiver device of a mobile device comprising an antenna port configured to receive an analog signal; a radio-frequency (RF)-frontend coupled to the antenna port and comprising a low noise amplifier free mixer-first front end configured to selectively filter the analog signal for a bandwidth selection; and a digital baseband interface coupled to the RF-frontend. The RF-frontend comprises: a coarse grain component, configured to generate a coarse grain frequency quantization for processing the analog signal to a digital signal. The RF-frontend comprises a mixer component, coupled to the antenna port, configured to down-convert the analog signal to a baseband signal and provide the baseband signal to a signal path; and a hybrid analog-to-digital converter (ADC) filtering component, coupled to the mixer component via the signal path, comprising a plurality of switching capacitor arrays having switching capacitor banks configured to adaptively generate a discrete-time filtering operation of the baseband signal and concurrently generate a conversion of the baseband signal to the digital signal in a same clock period, based on one or more criteria.

Example 2 includes the subject matter of Example 1, further comprising: an activation component configured to selectively activate switching capacitor arrays of the plurality of switching capacitor arrays to simultaneously generate the discrete-time filtering operation as a blocker rejection filtering operation of the baseband signal and a low-noise amplification gain with an ADC converter.

Example 3 includes the subject matter of any one of Examples 1-2, including or omitting optional elements, further comprising: a detection component configured to detect one or more of a blocker signal strength, a signal-to-noise ratio, a channel estimation datum or a power level, wherein the activation component is further configured to selectively activate the switching capacitor arrays of the plurality of switching capacitor arrays to selectively modify a resolution of the discrete-time filtering operation while generating the conversion based on the one or more criteria comprising at least one of the blocker signal strength, the signal to noise ratio, the channel estimation datum or the power level.

Example 4 includes the subject matter of any one of Examples 1-3, including or omitting optional elements, wherein the hybrid ADC filtering component is further configured to selectively activate at least one switching capacitor bank of the plurality of switching capacitor arrays to generate filtering coefficients of the discrete-time filtering operation to the baseband signal during a first portion of the same clock period and generate a successive approximation (SAR) ADC conversion as the conversion of the baseband signal to the digital signal during a second portion of the same clock period by reusing the at least one switching capacitor bank.

Example 5 includes the subject matter of any one of Examples 1-4, including or omitting optional elements, wherein the hybrid ADC filtering component is further configured to selectively activate a first switching capacitor array to generate filtering coefficients of the discrete-time filtering operation to the baseband signal and utilize a second switching capacitor array of the plurality of switching capacitor arrays to generate a successive approximation register (SAR) analog-to-digital conversion as the conversion of the baseband signal to the digital signal in the same clock period.

Example 6 includes the subject matter of any one of Examples 1-5, including or omitting optional elements, wherein the hybrid ADC filtering component is further configured to generate the conversion of the baseband signal to the digital signal in the same clock period by time interleaving switching banks of the plurality of switching capacitor arrays.

Example 7 includes the subject matter of any one of Examples 1-6, including or omitting optional elements, further comprising: a fine grain component, coupled to the plurality of switching capacitor arrays, configured to generate a fine grain frequency quantization from the coarse grain frequency quantization, wherein the fine grain component comprises a voltage controlled oscillator (VCO) and a VCO-based first order delta sigma ADC configured to oversample the coarse grain frequency quantization and amplify the coarse grain frequency quantization of the plurality of switching capacitor arrays based on a voltage-to-frequency gain of the VCO.

Example 8 includes the subject matter of any one of Examples 1-7, including or omitting optional elements, wherein the hybrid ADC filtering component is further configured to disable the VCO-based first order delta sigma ADC in response to a signal power satisfying a predetermined threshold.

Example 9 is a mixer-first LNA free front end system for a receiver comprising: an antenna port configured to receive an analog signal; an RF-frontend comprising a coarse grain component configured to generate a coarse grain frequency quantized signal from the analog signal, and a fine grain component configured to generate a fine grain quantized signal from the coarse grain frequency quantized signal. The coarse grain component comprises: a mixer component, connected to the antenna port, configured to down-convert the analog signal to a baseband signal and provide the baseband signal to a signal pipeline; and a hybrid analog-to-digital converter (ADC) filter component, coupled to the mixer component via the signal pipeline, comprising a plurality of switching capacitor arrays of switching capacitor banks configured to adaptively generate a discrete-time filtering operation of the baseband signal and concurrently generate a conversion of the baseband signal to a digital signal in a same clock cycle by time interleaving switching arrays of the plurality of switching capacitor arrays within the same clock cycle, based on one or more criteria.

Example 10 includes the subject matter of Example 9, including or omitting optional elements, wherein the fine grain component comprises: a voltage controlled oscillator (VCO)-based first order delta sigma ADC configured to receive the coarse grain frequency quantized signal at a successive approximation (SAR) output coupled to the plurality of switching capacitor arrays, oversample the SAR output and amplify a SAR residue of the plurality of switching capacitor arrays based on a voltage-to-frequency gain of a VCO coupled to the plurality of switching capacitor arrays.

Example 11 includes the subject matter of any one of Examples 9-10, including or omitting optional elements, further comprising: a detection component configured to detect the one or more criteria comprising at least one of a blocker signal strength of a blocker signal, a signal-to-noise ratio, a channel estimation datum or a power level at the signal pipeline.

Example 12 includes the subject matter of any one of Examples 9-11, including or omitting optional elements, further comprising: an activation component configured to selectively activate the switching capacitor arrays of the plurality of switching capacitor arrays via a feedback loop to a plurality of switches to modify a resolution of the discrete-time filtering operation by activating a first switching capacitor array of the plurality of switching capacitor arrays to filter the blocker signal while concurrently activating a second different capacitor array of the plurality of switching capacitor arrays to generate the conversion based on one or more channel characteristics received in a channel quality indication or a channel state information.

Example 13 includes the subject matter of Examples 9-12, including or omitting optional elements, wherein the activation component is further configured to adaptively modify the first switching capacitor array to selectively activate different capacitors within the first switching capacitor array, or by activating a third capacitor array coupled in a parallel configuration with the first switching capacitor array of the plurality of switching capacitor arrays to filter the blocker signal based on the one or more channel characteristics or the one or more criteria being received from the detection component.

Example 14 includes the subject matter of any one of Examples 9-13, including or omitting optional elements, wherein the activation component is further configured to time interleave the discrete-time filtering operation concurrently with the conversion by adaptively activating capacitors of at least one switching capacitor array of the plurality of switching capacitor arrays within the same clock cycle to generate the discrete-time filtering operation and the conversion by reusing the capacitors.

Example 15 includes the subject matter of any one of Examples 9-14, including or omitting optional elements, further comprising: a power scaling component configured to determine whether to activate or deactivate the voltage controlled oscillator (VCO)-based first order delta sigma ADC of the fine grain component via a VCO control switch based on one or more channel characteristics received in a channel quality indication or a channel state information, and to disable the VCO-based first order delta sigma ADC in response to a signal power satisfying a predetermined threshold.

Example 16 includes the subject matter of any one of Examples 9-15, including or omitting optional elements, wherein the hybrid analog-to-digital converter (ADC) filter component is further configured to generate the filtering in one phase of the same clock cycle and generate the conversion in another phase of the same clock cycle, while generating the time interleaving of the switching arrays of the plurality of switching capacitor arrays within the same clock cycle, based on the one or more criteria, to generate the filtering and the conversion together at a same time of the same clock cycle.

Example 17 includes the subject matter of any one of Examples 9-16, including or omitting optional elements, wherein the activation component is further configured to reduce a time differential between a filtering time of the discrete-time filtering operation and a conversion time of the conversion by selecting the switching capacitor arrays of the plurality of switching capacitor arrays for activation.

Example 18 is a method for a mixer-first receiver comprising: receiving, via an antenna port, an analog signal of a first operating band; down-converting the analog signal, via a mixer of a radio frequency (RF) frontend, to a baseband signal; filtering, via a hybrid analog-to-digital converter (ADC) filtering component, the baseband signal of the first operating band with a filtering operation along a signal pipeline; and converting, concurrently with the filtering via the hybrid analog-to-digital converter (ADC) filtering component, the baseband signal to a coarse grain frequency signal by adaptively generating a conversion of the baseband signal to a digital signal in a same clock cycle by a time interleaving operation of one or more switching arrays of a plurality of switching capacitor arrays within the same clock cycle, based on one or more criteria.

Example 19 includes the subject matter of any one of Example 18, further comprising: processing, via a voltage controlled oscillator (VCO)-based first order delta sigma ADC, the coarse grain frequency signal at a successive approximation (SAR) output coupled to the plurality of switch capacitor arrays of the hybrid ADC filtering component by oversampling the SAR output and amplifying a SAR residue of the plurality of switch capacitor arrays based on a voltage-to-frequency gain of a VCO coupled to the plurality of switch capacitor arrays to generate a fine grain frequency signal.

Example 20 includes the subject matter of any one of Examples 18-19, including or omitting optional elements, further comprising: detecting, via a detection component coupled to the SAR output along the signal pipeline, the one or more criteria comprising a blocker signal strength of a blocker signal and an operating band.

Example 21 includes the subject matter of any one of Examples 18-20, including or omitting optional elements, further comprising: selectively activating the switching capacitor arrays of the plurality of switching capacitor arrays via a feedback loop to a plurality of switches to modify a resolution of the filtering operation by activating a first switching capacitor array of the plurality of switching capacitor arrays to filter the blocker signal while concurrently activating a second different capacitor array of the plurality of switching capacitor arrays to generate the conversion based on one or more channel characteristics received in a channel quality indication or a channel state information.

Example 22 includes the subject matter of any one of Examples 18-21, including or omitting optional elements, further comprising: selectively activating the switching capacitor arrays of the plurality of switching capacitor arrays via a feedback loop to a plurality of switches based on the operating band changing from the first operating band to a second operating band that is different from the first operating band.

Example 23 includes the subject matter of any one of Examples 18-22, including or omitting optional elements, further comprising: time interleaving the filtering operation concurrently with the conversion by adaptively activating the plurality of switching capacitor arrays within the same clock cycle to generate the filtering operation and the conversion together.

Example 24 includes the subject matter of any one of Examples 18-23, including or omitting optional elements, further comprising: determining whether to activate or deactivate the voltage controlled oscillator (VCO)-based first order delta sigma ADC via a VCO control switch based on one or more channel characteristics received in a channel quality indication or a channel state information; and disabling the VCO-based first order delta sigma ADC in response to a signal power satisfying a predetermined threshold.

Example 25 includes the subject matter of any one of Examples 18-24, including or omitting optional elements, wherein the filtering and the converting further comprise: generating, via the hybrid analog-to-digital converter (ADC) filter component, the filtering in one half of the same clock cycle and generate the conversion in another half of the same clock cycle.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDM☐, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the acts and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. A mixer-first receiver device of a mobile device comprising:
    an antenna port configured to receive an analog signal;
    a radio-frequency (RF)-frontend coupled to the antenna port and comprising a low noise amplifier free mixer-first front end configured to selectively filter the analog signal for a bandwidth selection; and
    a digital baseband interface coupled to the RF-frontend;
    wherein the RF-frontend comprises:
        a coarse grain component, configured to generate a coarse grain frequency quantization for processing the analog signal to a digital signal, comprising:
            a mixer component, coupled to the antenna port, configured to down-convert the analog signal to a baseband signal and provide the baseband signal to a signal path; and
            a hybrid analog-to-digital converter (ADC) filtering component, coupled to the mixer component via the signal path, comprising a plurality of switching capacitor arrays having switching capacitor banks configured to adaptively generate a discrete-time filtering operation of the baseband signal and concurrently generate a conversion of the baseband signal to the digital signal in a same clock period, based on one or more criteria.

2. The mixer-first receiver device of claim 1, further comprising:
    an activation component configured to selectively activate switching capacitor arrays of the plurality of switching capacitor arrays to simultaneously generate the discrete-time filtering operation as a blocker rejection filtering operation of the baseband signal and a low-noise amplification gain with an ADC converter.

3. The mixer-first receiver device of claim 2, further comprising:
    a detection component configured to detect one or more of a blocker signal strength, a signal-to-noise ratio, a channel estimation datum or a power level, wherein the activation component is further configured to selectively activate the switching capacitor arrays of the plurality of switching capacitor arrays to selectively modify a resolution of the discrete-time filtering operation while generating the conversion based on the one or more criteria comprising at least one of the blocker signal strength, the signal to noise ratio, the channel estimation datum or the power level.

4. The mixer-first receiver device of claim 1, wherein the hybrid ADC filtering component is further configured to selectively activate at least one switching capacitor bank of the plurality of switching capacitor arrays to generate filtering coefficients of the discrete-time filtering operation to the baseband signal during a first portion of the same clock period and generate a successive approximation (SAR) ADC conversion as the conversion of the baseband signal to the digital signal during a second portion of the same clock period by reusing the at least one switching capacitor bank.

5. The mixer-first receiver device of claim 1, wherein the hybrid ADC filtering component is further configured to selectively activate a first switching capacitor array to generate filtering coefficients of the discrete-time filtering operation to the baseband signal and utilize a second switching capacitor array of the plurality of switching capacitor arrays to generate a successive approximation register (SAR) analog-to-digital conversion as the conversion of the baseband signal to the digital signal in the same clock period.

6. The mixer-first receiver device of claim 1, wherein the hybrid ADC filtering component is further configured to generate the conversion of the baseband signal to the digital signal in the same clock period by time interleaving switching banks of the plurality of switching capacitor arrays.

7. The mixer-first receiver device of claim 6, wherein the hybrid ADC filtering component is further configured to disable the VCO-based first order delta sigma ADC in response to a signal power satisfying a predetermined threshold.

8. The mixer-first receiver device of claim 1, further comprising:
a fine grain component, coupled to the plurality of switching capacitor arrays, configured to generate a fine grain frequency quantization from the coarse grain frequency quantization, wherein the fine grain component comprises a voltage controlled oscillator (VCO) and a VCO-based first order delta sigma ADC configured to oversample the coarse grain frequency quantization and amplify the coarse grain frequency quantization of the plurality of switching capacitor arrays based on a voltage-to-frequency gain of the VCO.

9. A mixer-first LNA free front end system for a receiver comprising:
an antenna port configured to receive an analog signal;
an RF-frontend comprising a coarse grain component configured to generate a coarse grain frequency quantized signal from the analog signal, and a fine grain component configured to generate a fine grain quantized signal from the coarse grain frequency quantized signal;
wherein the coarse grain component comprises:
a mixer component, connected to the antenna port, configured to down-convert the analog signal to a baseband signal and provide the baseband signal to a signal pipeline; and
a hybrid analog-to-digital converter (ADC) filter component, coupled to the mixer component via the signal pipeline, comprising a plurality of switching capacitor arrays of switching capacitor banks configured to adaptively generate a discrete-time filtering operation of the baseband signal and concurrently generate a conversion of the baseband signal to a digital signal in a same clock cycle by time interleaving switching arrays of the plurality of switching capacitor arrays within the same clock cycle, based on one or more criteria.

10. The system of claim 9, wherein the fine grain component comprises:
a voltage controlled oscillator (VCO)-based first order delta sigma ADC configured to receive the coarse grain frequency quantized signal at a successive approximation (SAR) output coupled to the plurality of switching capacitor arrays, oversample the SAR output and amplify a SAR residue of the plurality of switching capacitor arrays based on a voltage-to-frequency gain of a VCO coupled to the plurality of switching capacitor arrays.

11. The system of claim 9, further comprising:
a detection component configured to detect the one or more criteria comprising at least one of a blocker signal strength of a blocker signal, a signal-to-noise ratio, a channel estimation datum or a power level at the signal pipeline.

12. The system of claim 11, further comprising:
an activation component configured to selectively activate the switching capacitor arrays of the plurality of switching capacitor arrays via a feedback loop to a plurality of switches to modify a resolution of the discrete-time filtering operation by activating a first switching capacitor array of the plurality of switching capacitor arrays to filter the blocker signal while concurrently activating a second different capacitor array of the plurality of switching capacitor arrays to generate the conversion based on one or more channel characteristics received in a channel quality indication or a channel state information.

13. The system of claim 12, wherein the activation component is further configured to adaptively modify the first switching capacitor array to selectively activate different capacitors within the first switching capacitor array, or by activating a third capacitor array coupled in a parallel configuration with the first switching capacitor array of the plurality of switching capacitor arrays to filter the blocker signal based on the one or more channel characteristics or the one or more criteria being received from the detection component.

14. The system of claim 12, wherein the activation component is further configured to time interleave the discrete-time filtering operation concurrently with the conversion by adaptively activating capacitors of at least one switching capacitor array of the plurality of switching capacitor arrays within the same clock cycle to generate the discrete-time filtering operation and the conversion by reusing the capacitors.

15. The system of claim 12, wherein the activation component is further configured to reduce a time differential between a filtering time of the discrete-time filtering operation and a conversion time of the conversion by selecting the switching capacitor arrays of the plurality of switching capacitor arrays for activation.

16. The system of claim 9, further comprising:
a power scaling component configured to determine whether to activate or deactivate the voltage controlled oscillator (VCO)-based first order delta sigma ADC of the fine grain component via a VCO control switch based on one or more channel characteristics received in a channel quality indication or a channel state information, and to disable the VCO-based first order delta sigma ADC in response to a signal power satisfying a predetermined threshold.

17. The system of claim 9, wherein the hybrid analog-to-digital converter (ADC) filter component is further configured to generate the filtering in one phase of the same clock cycle and generate the conversion in another phase of the same clock cycle, while generating the time interleaving of the switching arrays of the plurality of switching capacitor arrays within the same clock cycle, based on the one or more criteria, to generate the filtering and the conversion together at a same time of the same clock cycle.

18. A method for a mixer-first receiver comprising:
receiving, via an antenna port, an analog signal of a first operating band;
down-converting the analog signal, via a mixer of a radio frequency (RF) frontend, to a baseband signal;
filtering, via a hybrid analog-to-digital converter (ADC) filtering component, the baseband signal of the first operating band with a filtering operation along a signal pipeline; and
converting, concurrently with the filtering via the hybrid analog-to-digital converter (ADC) filtering component, the baseband signal to a coarse grain frequency signal by adaptively generating a conversion of the baseband signal to a digital signal in a same clock cycle by a time interleaving operation of one or more switching arrays of a plurality of switching capacitor arrays within the same clock cycle, based on one or more criteria.

19. The method of claim 18, further comprising:
processing, via a voltage controlled oscillator (VCO)-based first order delta sigma ADC, the coarse grain frequency signal at a successive approximation (SAR) output coupled to the plurality of switch capacitor arrays of the hybrid ADC filtering component by oversampling the SAR output and amplifying a SAR residue of the plurality of switch capacitor arrays based on a voltage-to-frequency gain of a VCO coupled to the plurality of switch capacitor arrays to generate a fine grain frequency signal.

20. The method of claim 19, further comprising:
detecting, via a detection component coupled to the SAR output along the signal pipeline, the one or more criteria comprising a blocker signal strength of a blocker signal and an operating band.

21. The method of claim 20, further comprising:
selectively activating the switching capacitor arrays of the plurality of switching capacitor arrays via a feedback loop to a plurality of switches to modify a resolution of the filtering operation by activating a first switching capacitor array of the plurality of switching capacitor arrays to filter the blocker signal while concurrently activating a second different capacitor array of the plurality of switching capacitor arrays to generate the conversion based on one or more channel characteristics received in a channel quality indication or a channel state information.

22. The method of claim 20, further comprising:
selectively activating the switching capacitor arrays of the plurality of switching capacitor arrays via a feedback loop to a plurality of switches based on the operating band changing from the first operating band to a second operating band that is different from the first operating band.

23. The method of claim 20, further comprising:
time interleaving the filtering operation concurrently with the conversion by adaptively activating the plurality of switching capacitor arrays within the same clock cycle to generate the filtering operation and the conversion together.

24. The method of claim 23, further comprising:
determining whether to activate or deactivate the voltage controlled oscillator (VCO)-based first order delta sigma ADC via a VCO control switch based on one or more channel characteristics received in a channel quality indication or a channel state information; and
disabling the VCO-based first order delta sigma ADC in response to a signal power satisfying a predetermined threshold.

25. The method of claim 18, wherein the filtering and the converting further comprise:
generating, via the hybrid analog-to-digital converter (ADC) filter component, the filtering in one half of the same clock cycle and generate the conversion in another half of the same clock cycle.

* * * * *